April 22, 1930. B. C. AMES 1,755,417

FRUIT CLIPPER

Filed June 19, 1928

Inventor

Bliss C. Ames.

By Lyon & Lyon

Attorneys

Patented Apr. 22, 1930

1,755,417

UNITED STATES PATENT OFFICE

BLISS C. AMES, OF CORONA, CALIFORNIA

FRUIT CLIPPER

Application filed June 19, 1928. Serial No. 286,653.

This invention relates to fruit clippers and, more especially, to a type of fruit clipper that can be used in picking oranges without the danger of injuring the peel of the orange, when the orange picker accidentally strikes the orange with the clipper, as it frequently the case.

It is well understood that a clipper for severing orange stems must operate in a manner to clip the stem very close to the orange and, in fact, at a point within the little pocket where the stem is attached so that when the oranges are packed, the cut ends of the stems do not project from the pockets, for, if they do, said stems injure the peel of the adjacent oranges and decay rapidly sets in at the injured place. In this respect, this clipper follows approved lines of construction. However, the orange picker, being generally more or less unskilled labor, frequently strikes the cutter blade end of the clipper against the skin or peel of the orange before he gets the clipper in position to sever the stem and clippers of prior construction have their blade ends rather sharp, thus entailing that where the blade end strikes the orange peel injury is done thereto and this, also, results in decay setting in at the injured point. It is to avoid this latter-mentioned injury that I have constructed this invention.

To obtain the desired results, I provide cutter blade tips that are rounded upwardly at their inner edges so that when the clipper is open, the position in which it is held by the picker when he thrusts the clipper toward the fruit, the rounded inner edges will engage the skin of the fruit, thus avoiding so-termed clipper cuts, which results when the inner sharp corners or edges of prior clippers strike the fruit skin.

Other objects and advantages will appear in the subjoined detailed description.

The accompanying drawings illustrate the invention.

Figure 1:
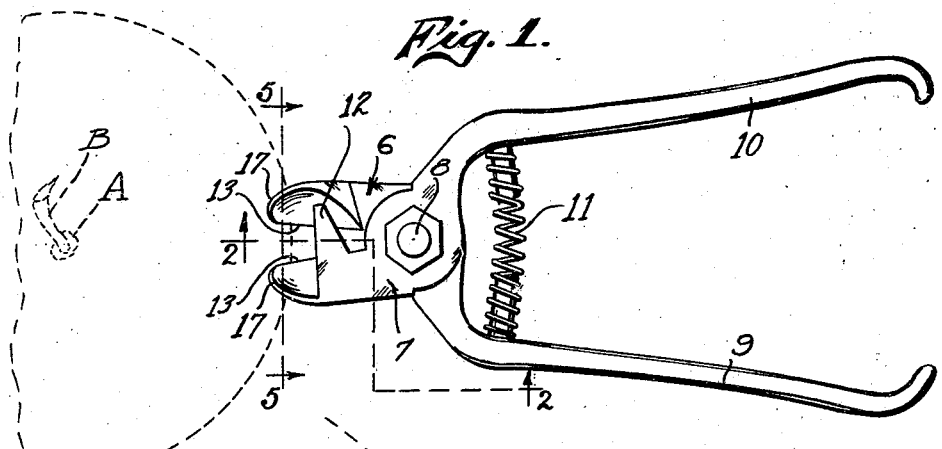
Figure 1 is a plan view of a fruit clipper constructed in accordance with the provisions of this invention, a fragment of an orange being indicated in dotted lines in position to be engaged by the inner tip edges of the blades.

There are provided cutter blades, indicated in general by the characters 6, 7. The blades are pivoted together by a pivot 8. The blades 6, 7 are provided, respectively, with handles 9, 10, which are normally held spread apart by a coil spring 11 that is placed between the handles. Thus the spring 11 normally holds the blades 6, 7 in the open position shown in the drawings. The blade 7, as is customary, is provided with a stem-guard 12 to limit the distance to which the fruit stem enters the space between the blades when said blades are open.

The invention lies in the particular shape of the blades 6, 7 and, more especially, in the particular shape of the tips of said blades. The cutting edges of the blades are indicated at 13. In the present instant the cutting edges lie in the same horizontal plane so as to abut when the clipper is closed, thus to sever the fruit stem by a pinching cut rather than by a shearing cut.

Figure 2:
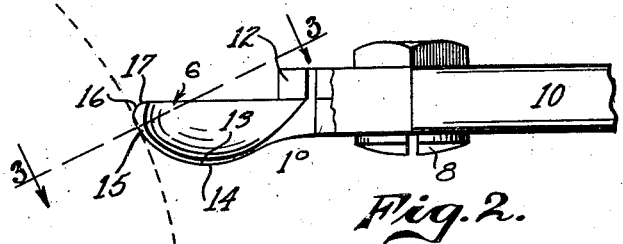
Figure 2 is an enlarged fragmental vertical view, partly in section, viewed from the line indicated by 2—2, Fig. 1.

The cutting edges 13 are downwardly convex longitudinally of the blades as clearly shown in Fig. 2. In this instance, the cutting edges 13 are slightly above the level of the lowest portions 14 of the blades, as clearly shown in Fig. 2, although this is not absolutely essential.

The tips of the blades are curved upwardly and forwardly from the cutting edges 13, as indicated at 15, thence upwardly and rearwardly, as indicated at 16, thus producing blunt noses or tips on the cutters. The rims 17 of the tips are preferably of a material thickness so as to present an unsharpened or blunt top edge for the tips.

Figure 4:
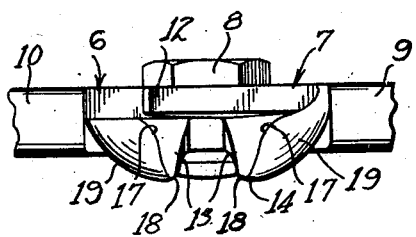
Figure 4 is an enlarged view of the cutter blade end of the clipper looking toward the right in Fig. 1.
Figure 5:
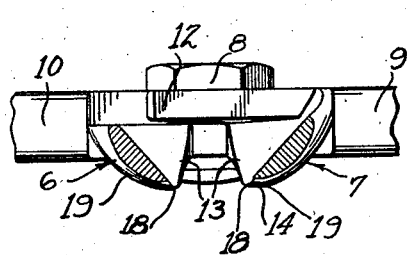
Figure 5 is an enlarged vertical view, partly in section, from the line indicated by 5—5, Fig. 1.
Figure 3:
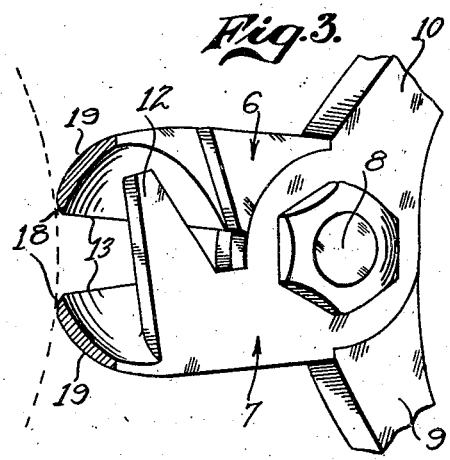
Figure 3 is a perspective view, partly in section, from the line indicated by 3—3, Fig. 2.

Referring more particularly to Figs. 3 and 5, it will be seen that the blade tips are downwardly convex and that the inner edges of said tips, as clearly shown in Fig. 1, viewed in plan, curve inwardly and rearwardly. More particularly it will be noted, by referring to Figs. 4 and 5, that, viewed in end elevation, the inner edges of the blade tips curve inwardly and upwardly, as indicated at 18, so that when the tips of the blades are in contact with the fruit skin, as in Fig. 3, the convex surfaces 19 of the blades, even when the blades are open, will engage the fruit skin and thus prevent the inner edges of the tips from coming into contact with the fruit skin.

This is a very important feature of the invention, since it causes the inner edges of the blade tips to lie slightly above the level of the lowermost portions 19 of the blade tips, thus ensuring against the inner tip edges cutting and injuring the skin of the fruit.

It will be seen by referring to Fig. 1, that the rims of the blade tips gradually thin and merge into the cutting edges 13, and that this merging is rearwardly of the very front ends of the tips. Thus the blade tips are dull or blunt in all aspects of them.

The fruit picker uses the above described clippers in the same manner as prior fruit clippers of this general type by thrusting the blades on opposite sides of the stem of the fruit until the guard 12 comes against the stem, with the convex portion 14 of the blades resting well within the small cup A from which the stem B protrudes. After thus positioning the clipper blades, or jaws, the picker presses the handles 9, 10 toward each other, thus closing the blades upon the stem and causing the cutting edges to sever the stem at a point well within the cup A.

I claim:

1. A fruit clipper comprising pivotally connected blades provided with cutting edges, the tips of the blades provided with upwardly and inwardly curved inner edges adjoining the forward ends of the cutting edges.

2. A fruit clipper comprising pivotally connected blades provided with downwardly convex longitudinally extending cutting edges, the tips of the blades curved inwardly and rearwardly in plan and the inner edges of the tips curved upwardly and inwardly and adjoining the forward ends of the cutting edges.

3. A fruit clipper comprising pivotally connected downwardly convex blades provided with cutting edges, the tips of the blades curved upwardly and rearwardly and provided with rims of a material thickness, said rims curved inwardly and rearwardly and merging with the forward ends of the cutting edges.

4. A fruit clipper comprising pivotally connected blades provided with convex tips and with cutting edges extending rearwardly from said tips, the inner edges of the tips lying at a higher level than portions lying outwardly from said edges when the cutting edges are approximately in a horizontal plane so that said outwardly lying portions when engaged with the fruit function to hold the fruit against engagement with the inner edges of the tips.

Signed at Waltham, Mass., this 9th day of June, 1928.

BLISS C. AMES.